US008495081B2

(12) United States Patent
Junginger et al.

(10) Patent No.: US 8,495,081 B2
(45) Date of Patent: *Jul. 23, 2013

(54) METHOD, SYSTEM AND COMPUTER PROGRAM PRODUCT FOR FEDERATING TAGS ACROSS MULTIPLE SYSTEMS

(75) Inventors: Michael Junginger, Boeblingen (DE); Mareike Lattermann, Boeblingen (DE); Andreas Nauerz, Boeblingen (DE); Thomas Steinheber, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 19 days.

This patent is subject to a terminal disclaimer.

(21) Appl. No.: 12/967,549

(22) Filed: Dec. 14, 2010

(65) Prior Publication Data

US 2011/0314014 A1 Dec. 22, 2011

(51) Int. Cl.
*G06F 17/30* (2006.01)
*G06Q 10/00* (2006.01)
*G06Q 30/00* (2006.01)
*G06G 1/12* (2006.01)

(52) U.S. Cl.
CPC ..................................... *G06Q 10/00* (2013.01)
USPC ........... 707/767; 707/726; 707/748; 707/754; 705/26.7; 705/27.2; 705/7.33

(58) Field of Classification Search
CPC . G06F 17/30; G06G 1/12; G06Q 10/00; G06Q 30/00
USPC .................. 707/705–711, 723, 736, 748, 758, 707/805, 726, 767, 769; 715/205–209, 233–236, 257–261, 273, 738–749; 705/7.32, 1.1, 7.33, 26.7, 27.2; 709/203, 709/206
See application file for complete search history.

(56) References Cited

U.S. PATENT DOCUMENTS 5,678,041 A * 10/1997 Baker et al. ........................... 1/1
7,536,637 B1 * 5/2009 Nauerz et al. .................. 715/230
(Continued)

FOREIGN PATENT DOCUMENTS

EP 1550970 * 7/2005
EP 2259218 * 12/2010
(Continued)

OTHER PUBLICATIONS

Binge Cui et al. "An Online Book Recommendation System Based on Web Service", Sixth International Conference on Fuzzy Systems and Knowledge Discovery, 2009, pp. 520-524.*

*Primary Examiner* — Srirama Channavajjala
(74) *Attorney, Agent, or Firm* — Jeffrey T. Holman

(57) ABSTRACT

A method, system, and computer program product for federating tags across multiple web-based systems in order to provide an improved tag management system which allows users of a community to upload their contributions to the content of the content server systems, including uploading their tags. The method includes: storing tags in a central database, wherein the central database accesses the resources and the tags of the multiple systems; retrieving all tags from the central database; displaying the tags to a user; receiving a search request by the user, wherein the user search comprises selection of specific tags or specification of tag search criteria; generating a tag cloud containing references to tag-associated resources which result from the search, wherein the resources may reside in any one of the systems; and displaying the resources.

6 Claims, 5 Drawing Sheets

U.S. PATENT DOCUMENTS

| | | | |
|---|---|---|---|
| 7,610,219 B2 * | 10/2009 | Sayed | 705/26.2 |
| 2002/0045959 A1 * | 4/2002 | Van Overveld | 700/90 |
| 2002/0194602 A1 * | 12/2002 | Gutta et al. | 725/45 |
| 2003/0055816 A1 * | 3/2003 | Paine et al. | 707/3 |
| 2005/0193367 A1 * | 9/2005 | Allen et al. | 717/105 |
| 2007/0064626 A1 * | 3/2007 | Evans | 370/254 |
| 2007/0168357 A1 * | 7/2007 | Mo | 707/10 |
| 2007/0174247 A1 * | 7/2007 | Xu et al. | 707/3 |
| 2007/0198206 A1 * | 8/2007 | Jagerbrand et al. | 702/128 |
| 2007/0226077 A1 * | 9/2007 | Frank et al. | 705/27 |
| 2008/0072145 A1 * | 3/2008 | Blanchard et al. | 715/273 |
| 2008/0189312 A1 | 8/2008 | Taranov et al. | |
| 2008/0288476 A1 * | 11/2008 | Kim et al. | 707/4 |
| 2009/0094189 A1 * | 4/2009 | Stephens | 707/2 |
| 2009/0164516 A1 * | 6/2009 | Svendsen et al. | 707/104.1 |
| 2009/0271416 A1 * | 10/2009 | White et al. | 707/100 |
| 2009/0327336 A1 * | 12/2009 | King et al. | 707/103 R |
| 2012/0219191 A1 * | 8/2012 | Benzarti et al. | 382/106 |

FOREIGN PATENT DOCUMENTS

| | | | |
|---|---|---|---|
| WO | WO 00/65471 | * | 11/2000 |
| WO | WO 03/017045 | * | 2/2003 |
| WO | WO 2007/007964 | * | 1/2007 |
| WO | WO 2009/073858 | * | 6/2009 |

* cited by examiner

UPLOAD FEDERATED TAG

METHOD, SYSTEM AND COMPUTER PROGRAM PRODUCT FOR FEDERATING TAGS ACROSS MULTIPLE SYSTEMS

CROSS-REFERENCE TO RELATED APPLICATIONS

This application claims the benefit of priority of German Patent Application No. 09178998.2 entitled "Method, System and Computer Program Product for Federating Tags across Multiple Systems," which was filed on Dec. 14, 2009, and is hereby incorporated by reference.

BACKGROUND

In recent years, web-based systems such as Enterprise Information Portals have gained importance in many companies. Such systems integrate, as a single point of access, various applications and processes into one homogeneous user interface.

Today, such systems include a huge amount of content. They are no longer exclusively maintained by an IT department. Instead, Web 2.0 techniques are used increasingly, allowing user generated content to be added. These systems grow quickly and, often, in an uncoordinated way as different users possess different knowledge and expertise and obey to different mental models.

This continuous growth makes access to highly relevant information difficult. Users may need to find task- and role-specific information quickly, but face information overload and often feel lost in hyperspace.

Thus, users often miss out on resources that are potentially relevant to their tasks, simply because they never come across those resources. Users often obtain too much information that is not relevant to their current task, and it becomes cumbersome to find the right information and, hence, they do not obtain all the information that would be relevant.

The recent popularity of collaboration techniques on the Internet, particularly tagging and rating, provides new ways for both semantically describing Portal content as well as for reasoning about users' interests, preferences and context.

In this context, tagging is the process of assigning keywords (or metadata) to resources. A tag itself is "some" metadata associated to a resource. Tags themselves are non-hierarchical keywords taken from an uncontrolled vocabulary. In this context, a resource is an entity that is uniquely identifiable (addressable). Tags can add valuable meta information and even lightweight semantics to web resources.

Rating is the evaluation or assessment of something, in terms of quality (as with a critic rating a novel), quantity (as with an athlete being rated by his or her statistics), or some combination of both. That is, it is the process of assigning (e.g., numeric) "value" to resources indicating how much people "like" those resources. A rating itself is "some value" associated to a resource. Ratings themselves are chosen from an interval of possible "values" in which the one end of the interval usually refers to "dislike" and the other end of the interval refers to "like."

FIG. 1 illustrates an example of this problem using basic structural components of a conventional hardware and software environment used for a conventional tagging-based method when searching for some content.

A web client 10 among a plurality of web clients cooperates with a web server 12 during a search for selected content. Tags 14 are used for characterizing the content. There are many resources 16A through 16N available for being accessed by the person conducting the search using the web client 10 with a respective Web Browser. The user may find the best suited content when the tags 14 are selective enough for the searching user.

A similar situation occurs to the user when he searches for content in a different web server as shown in FIG. 2.

Taranov et al (U.S. Pat. Pub. No. 2008/0189312), which is incorporated by reference, discloses a uniformly managed taxonomy system in order to manage vocabulary terms across heterogeneous or different resource domains. In this publication, such taxonomy system may implement a vocabulary management module in order to manage a taxonomy of formal and informal vocabulary terms organized in a hierarchical structure. Further, it is proposed to associate each vocabulary term with multiple resources from different resource domains and to store the resource associations or resource relationships in a central database. In this manner, a single managed taxonomy system may be used to manage the resource associations or resource relationships uniformly about source domains. Such a centralized management of taxonomy across heterogeneous systems provides a centralized and shared database of tags and their relationships, which may be used for various knowledge based applications such as classification applications, search applications, tagging applications, etc.

FIG. 2 illustrates a conventional embodiment in which a user (web client 10) may send a request specifying for example a certain tag (e.g., New York) and another tag (e.g., cheap hotels) to the taxonomy manager 20, which in turn processes the centralized taxonomy for these tags and forwards respective responses to all of the web server systems 12, namely 12A, 12B, 12C and 12D. Each of the systems 12 will respond to this forwarded request with, for example, a ranked list of hits from each of the respective server systems.

This conventional approach, however, cannot be used for state of the art behavior of communities in which each community member may upload his or her own contributions to a taxonomy system which exists in the web server system 12.

SUMMARY

Embodiments of a method are described. In one embodiment, the method is a method for storing tags in a central database. The central database accesses resources and tags of multiple web-based systems. An embodiment of the invention includes retrieving all tags from the central database. The method also includes displaying the tags to a user. The method also includes receiving a search request by the user against the central database. The search includes selection of specific tags or entry of tag search criteria. The method also includes generating a tag cloud containing references to tag-associated resources which result from the search. The resources may reside in any one of the systems. The method also includes displaying the resources. Other embodiments of the method are also described. Embodiments of corresponding systems and apparatuses are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Embodiments of the present invention are illustrated by way of example and is not limited by the shape of the figures of the drawings in which.

Throughout the description, similar reference numbers may be used to identify similar elements.

DETAILED DESCRIPTION

Figure 1:
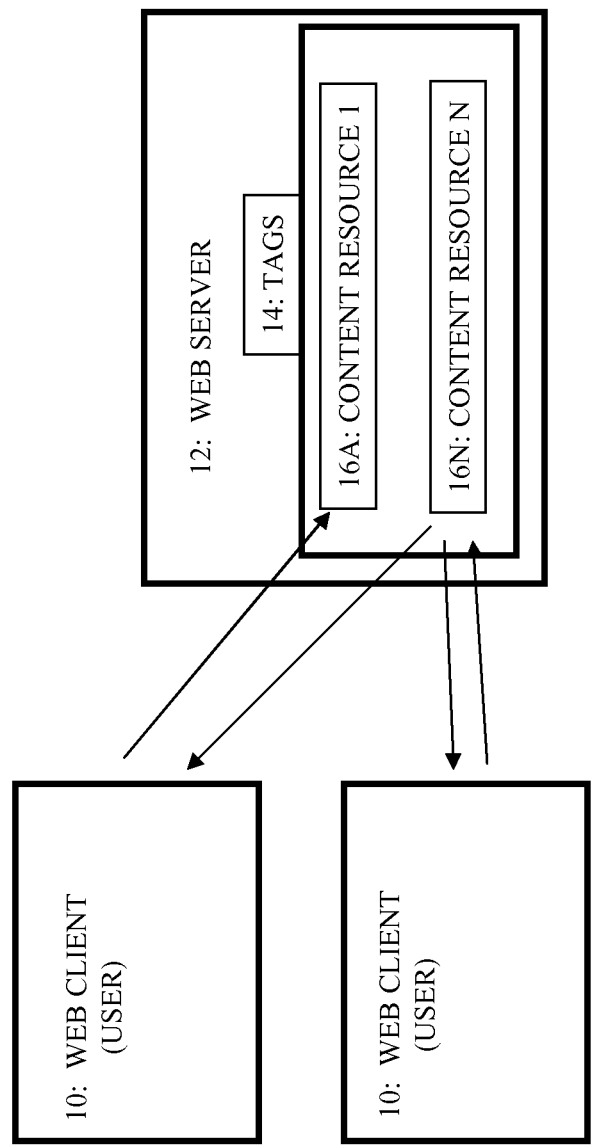
FIG. 1 illustrates the most basic structural components of a conventional hardware and software environment used for a conventional method, showing multiple users accessing a web server hosting some tagged content.
Figure 2:
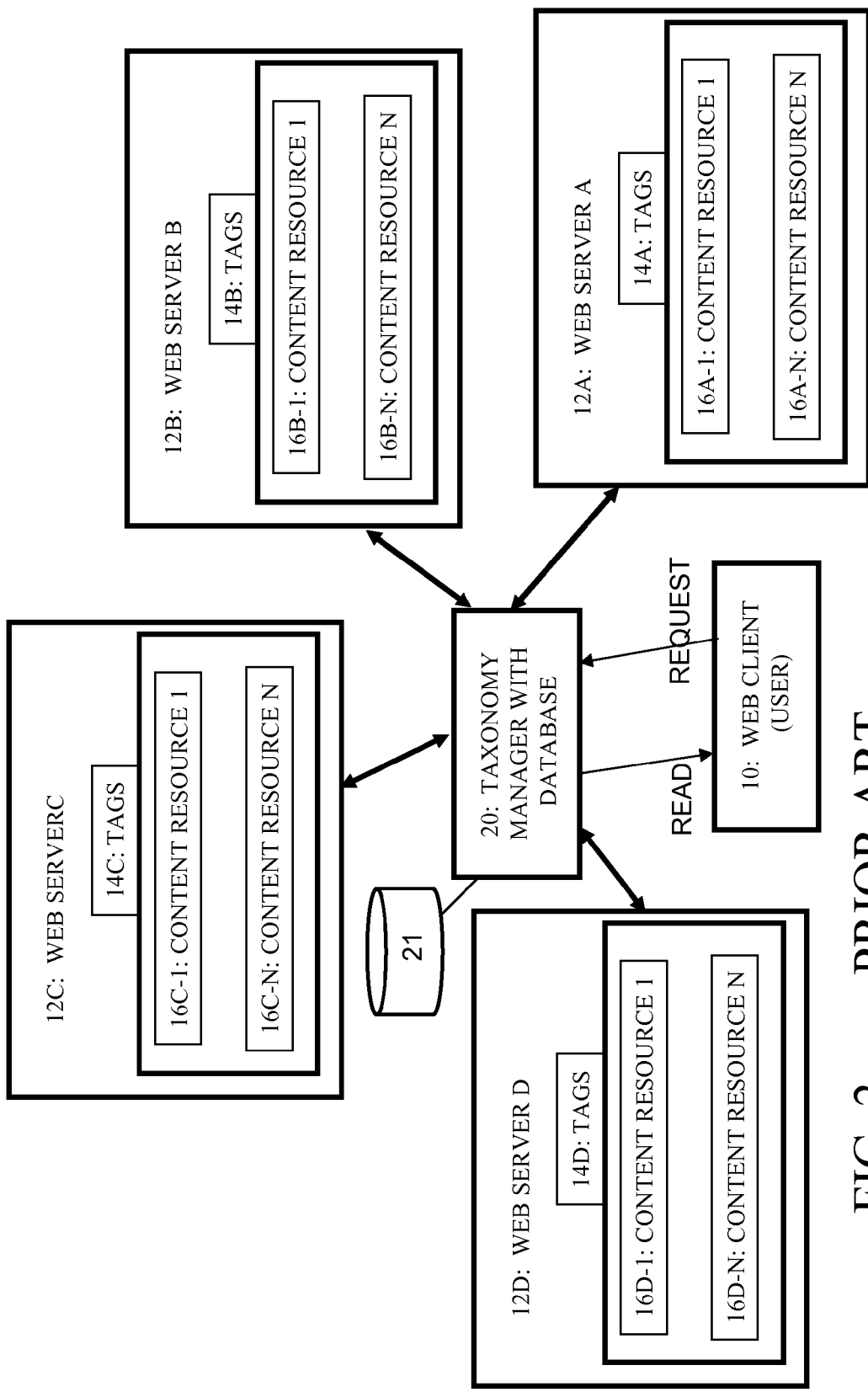
FIG. 2 illustrates the most basic structural components of a conventional hardware and software environment used for a conventional method, showing a single user accessing multiple web servers each hosting some tagged content via a taxonomy manager operating on a centralized tag database.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments include a federation manager component which manages a federation storage advantageously in the form of a cache, which pre-stores the system responses for the mostly used tags. Further, in some embodiments, the federation manager component manages a look-up table. For each tag within the look-up table, the associated resource is stored using a unique resource ID, a unique application ID identifying the web server application which hosts a specific resource, a tag name, and a user name. This logical data scheme enables the federation manager to scan all connected web server systems for any tag issued by any user request. Further, when a user wants to upload his own content, which has been tagged by him, he will upload his tag and a link to the resource to the federation manager. The federation manager will then store this information in its centralized database. If the content which had been tagged by a user is not residing on any of the before mentioned web server systems, but instead is on a different web server system not yet registered at the federation manager, the federation manager will register that new server and will store the complete URL establishing the link to the resource. By this feature, tag clouds can be made visible to a requesting user, which include the contributions of all community members which have uploaded their own tags related with their own resources to the federation manager. In this way, embodiments described herein are able to open up such tags across a system for being actively used and maintained by all members of a community having access to either registered web servers or other web servers, which have not been registered at the federation manager.

Further embodiments described herein are enriched by one or more additional services. For example, some embodiments include a normalizer service which normalizes different prevailing spelling types of a tag. As another example, some embodiments include a recommender service, which additionally recommends further resources which are related to a certain tag or resource requested by a user. As another example, some embodiments include a type-ahead service which is available for the extended tag and content reservoir due to the additional upload facility for the community members.

Further embodiments described herein facilitate third party tagging by which the owner of a website which does not provide for tagging the website contents is enabled to allow the community to tag the contents of the website.

Embodiments described herein may be implemented by a sequence of operations or steps involving a user interface fragment (UI fragment) in the form of, for example, a widget in Java script language (or another similar language), which is interpreted into the non-taggable website and which receives a certain tag and an associated link to the resource related to the tag. Then, both the tag and associated link are stored in the federation manager, accompanied by the application ID and user ID, as described above.

Using these and/or other features described below, at least some of the embodiments described herein provide an improved tag management system which allows the users of a community to upload their own contributions to the content of the content server systems including uploading their own tags.

Figure 3:
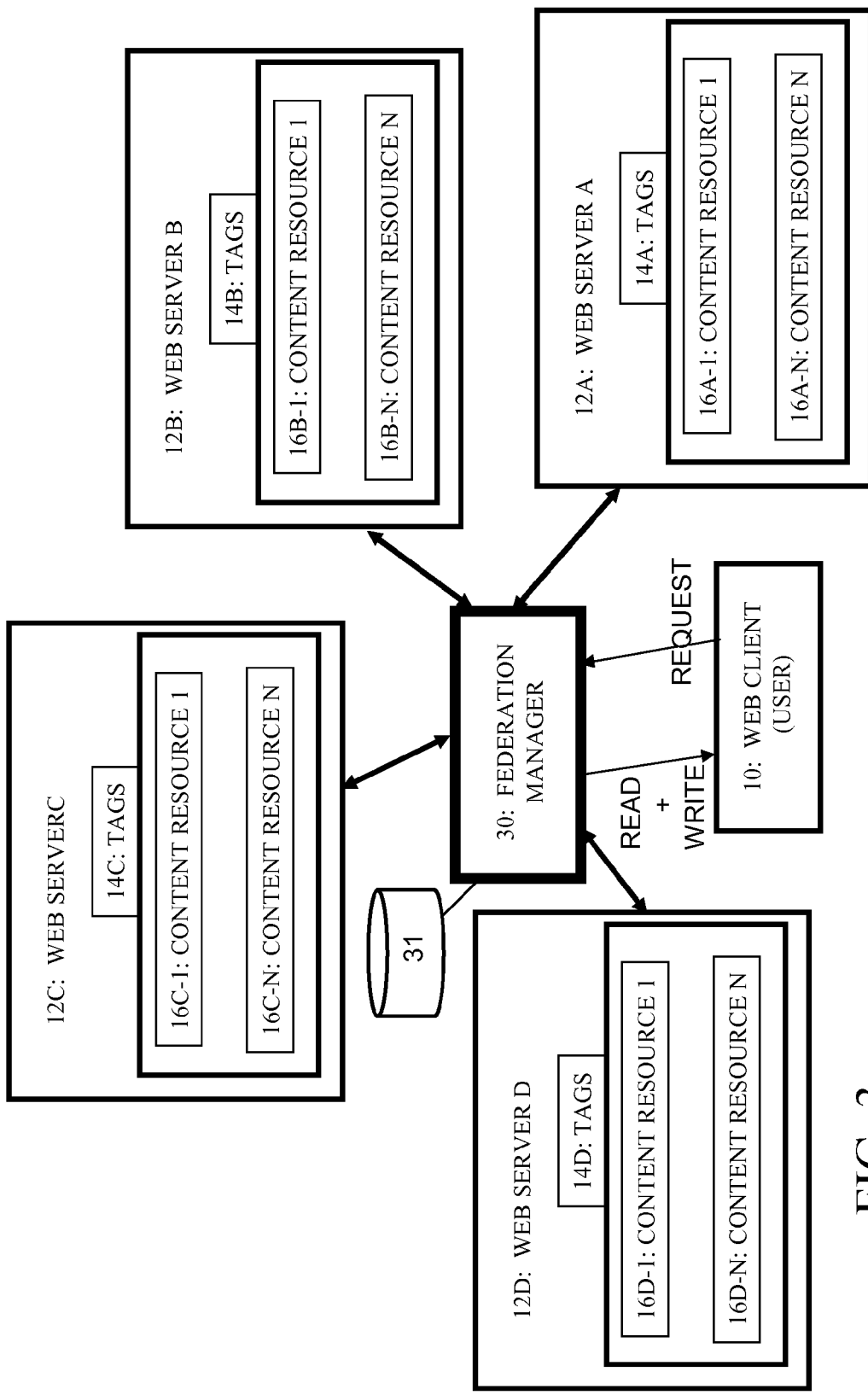
FIG. 3 illustrates one embodiment of structural components of a hardware and software environment showing in an overview representation a single user accessing multiple web servers, each hosting some tagged content via a taxonomy manager operating on a centralized tag database, and allowing an upload of content and associated tags to a community-shared dataspace.

FIG. 3 illustrates one embodiment of the web client 10 with functionality to write into the storage space provided by the federation manager 30. This allows the user of the web client 10 to upload (i.e., write) the user's own links to resources combined with respective tags.

Figure 4:
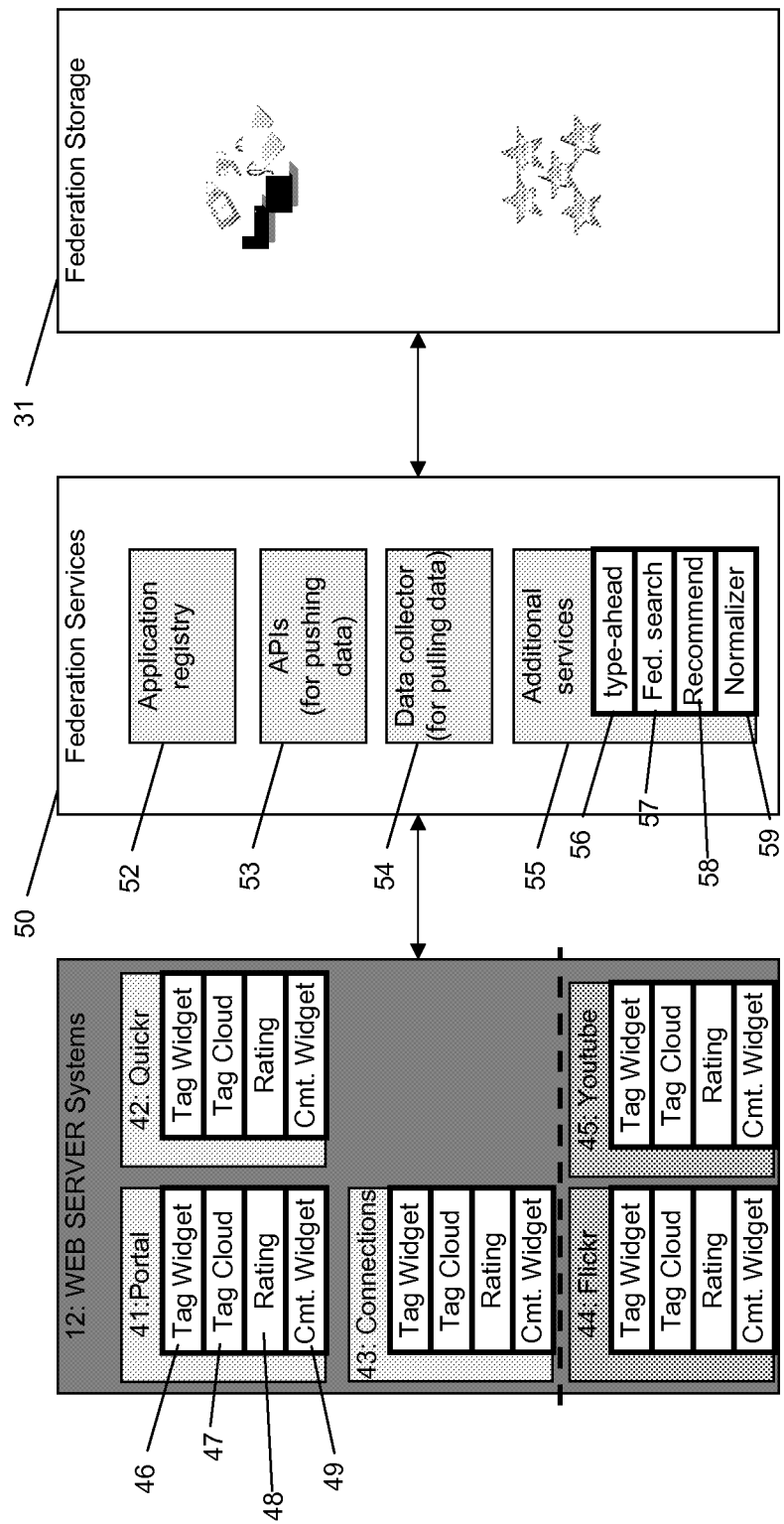
FIG. 4 is a schematic representation of one embodiment of a federation manager system and context to a web server system coupled thereto.

FIG. 4 illustrates a more detailed embodiment of federation services 50 provided by the federation manager 30 as depicted in FIG. 3. For reference, the upper group of symbols within the federation storage 31 represents different tags from respective different systems, and the lower group of symbols represents ratings.

FIG. 4 also illustrates the relation between typical web server systems 12 and the federation services 50 in order to store tags to the federation storage 31. In a typical production environment, several different web server systems 12 delivering different services and applications can be deployed. Some examples include a Web Portal server 41, or a system providing social networking services like IBM Lotus Connections 43, or a system providing functionality for computer-supported collaborative work ("virtual team-spaces") like IBM Lotus Quickr 42. Each system can be equipped with user interface (UI) fragments ("widgets") allowing for tagging and rating. These widgets can either be injected by the federation services 50 described herein or may be part of the system itself.

In some embodiments, the tag widget 46 allows single users to assign tags to resources. The tag cloud 47 provides an aggregated view of several tags with a certain scope (e.g. tags across all resources of the type "books" or "movies"). The rating widget 48 allows single users to assign ratings to resources, and the commenting widget 49 allows users to assign comments to resources. In one embodiment, systems to be taken into consideration can even reside outside of the immediate IT environment, i.e., can be external systems such as Flickr or YouTube.

In some embodiments, these widgets are the fragments that transmit the data of interest to the federation services 50. For example, when a user uses the tag widget 46 to assign a tag to a resource, the widget transmits the application ID of the application in which this tag widget resides, the ID of the resource being tagged and information about the tag itself. Storing this information is performed by using the federation service's APIs 53. The application ID is stored in the application registry 52.

Alternatively, existing data (about tags, rating, comments, etc.) can also be pulled from a web server system instead of being pushed to the federation services by a user. Therefore a data collector 54 is provided.

In one or more embodiments, additional services 55 may include: a type-ahead service 56 which assists users when tagging (showing tag names already being available when starting to type a tag name), a federative search 57 to do tag-based searching across all connected systems, a normalizer 59 to normalize tag names (e.g. converting them to lowercase representation, etc.), and a recommender 58 able to do tag-based recommendations of related content.

In one embodiment, the federation services store tags in the federation storage 31.

Figure 5:
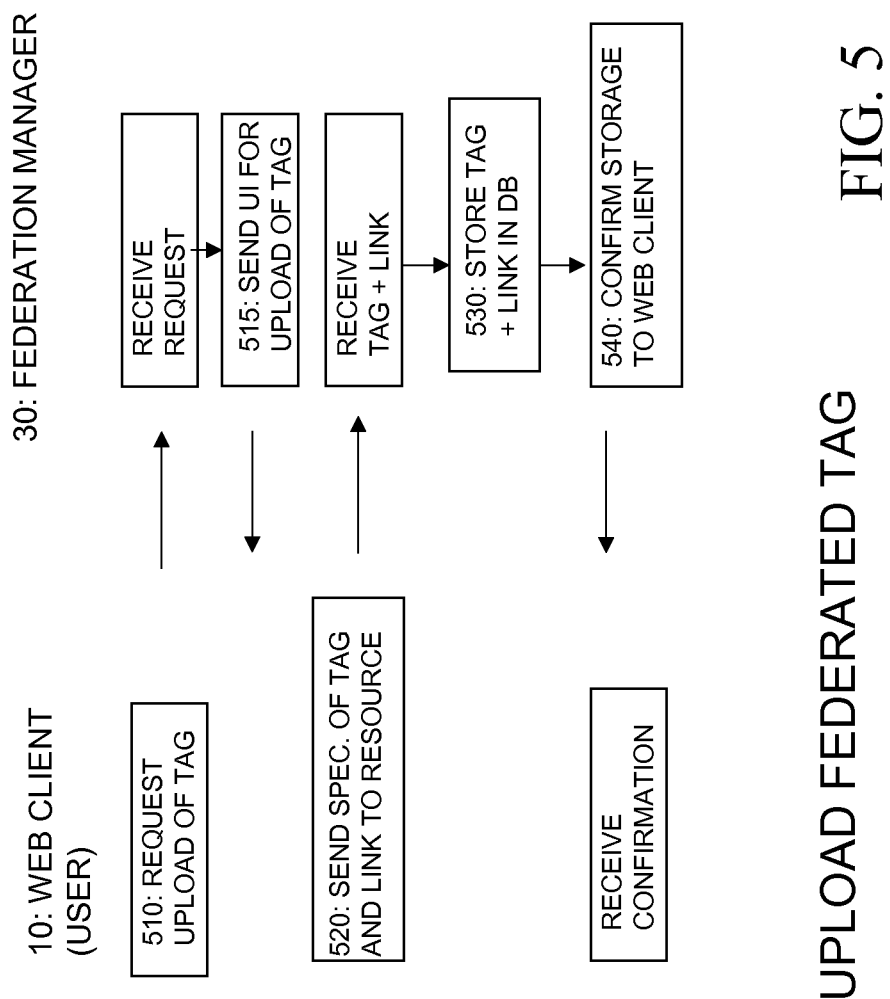
FIG. 5 illustrates one embodiment of a method for the control flow during user-initiated upload of tagged content to the federation manager.

FIG. 5 illustrates one embodiment of an interaction diagram with some of the operations that might be implemented for uploading a user's content and associated tags to the federation manager component.

More specifically, FIG. 5 visualizes how users can upload tags to the federation system 30. In one example, a user may be surfing through a web server system. At some point in time, the user might see a content fragment (e.g., a book or a movie) which he decides to tag. In one embodiment, icons are available to trigger such a tagging process. Once the user clicks 510 such an icon, a tag widget appears which might be either the tag widget part of the system or the one injected by the federation services. In either case, the user will enter the name of the tag with which the underlying resource (content fragment) shall be tagged. Upon submitting the tag, including the link to the content, the widget transmits 520 this tag name along with the ID of the resource and the application ID, to the federation manager. The federation manager stores 530 the tag to the federation storage and confirms 540 to the web client that the tag is successfully stored.

Embodiments of the invention can take the form of an entirely hardware embodiment, an entirely software embodiment or an embodiment containing both hardware and software elements. In some embodiments, certain functional aspects of the invention are implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product comprising a computer useable storage medium including a computer readable program, wherein the computer readable program includes a functional component that when executed by a processing device within a computer causes the computer to perform operations comprising:
   displaying a user interface fragment in a browser of a user web client for the upload of a resource to a web server system,
   wherein the resource is rated with a rating by the user and tagged with a tag by the user,
   registering the web server system by assigning an application ID and storing the application ID in an application registry wherein the application registry is stored in a central database coupled to a federation manager,
   receiving the tag, the rating, and a link to the resource at the federation manager,
   storing the tag, the rating and the link in the central database coupled to the federation manager,
   offering the resource for retrieval by another user web client,
   retrieving existing data from the registered web server system, wherein the retrieving is autonomous and not in response to the user initiating a transfer of the existing data, and wherein the existing data comprises links to resources, tags, and ratings not previously stored in the central database,
   storing the existing data in the central database,
   additionally recommending further resources which are related to a tag or resource requested by a user,
   offering a user interface for a user to tag the contents of a website, and
   displaying a tag cloud to the user wherein the tag cloud displays tags, resources, and a federative search, wherein the resources are located on any web server system registered in the central database, and wherein the federative search allows searching of the central database and all web server systems.

2. The computer program product of claim 1, wherein the computer readable program, when executed by the processing device within the computer, causes the computer to perform further operations comprising normalizing different prevailing spelling types of a tag.

3. A method for federating tags across multiple systems, wherein said tags are associated to resources, wherein said resources reside on a server of a web-based system and are accessible via web-clients, the method comprising:
   storing the tags, a link to the resource, and a rating associated to the resource in a central database wherein the central database is accessible by multiple systems,
   invoking a tag cloud in response to a user request,
   wherein the tag cloud displays tags and resources available in all systems managed by a federation manager,
   wherein the tag cloud displays a federative search, wherein the federative search allows a search of the central database and the multiple systems,
   retrieving a plurality of tags from the central database,
   sending the tags to a user web client for display of the tags to said user,
   receiving a select request for a specific tag by said user,
   registering the systems managed by the federation manager by assigning an application ID wherein the application ID is stored in an application registry on the central database,
   sending tag-associated resources, which have been tagged by the specific tag, from one or more of the systems to the user web client for display,
   facilitating redirection of said user to the selected resources,
   sending tag-associated resources with similar tags from other systems to the user web client for display,
   sending instructions to a user web client to display a user interface fragment in a browser of the user web client for uploading a resource which is tagged with a tag by the user to the federation manager,
   receiving the user's tag and a link to the tagged resource at the federation manager,
   storing said tag and link in a central database coupled to the federation manager,
   offering said tagged resource for retrieval by a user of another user web client,
   retrieving existing data from the registered systems managed by the federation manager, wherein the retrieving is autonomous and not in response to the user initiating a transfer of the existing data, and wherein the existing data comprises links to resources, tags, and ratings not previously stored in the central database, and
   storing the existing data in the central database,
   additionally recommending further resources which are related to a tag or resource requested by a user, and
   offering a user interface for a user to tag the contents of a website.

4. The method according to claim 3, further comprising: normalizing different prevailing spelling types of a tag.

5. A federation manager component within an electronic data processing system for use in federating tags across multiple systems, wherein said tags are associated to resources, wherein said resources reside on a server of a web-based system and are accessible via web-clients, wherein the federation manager component is configured to:
   display a user interface fragment in a browser of a user web client for the upload of a resource to a web server system,
   wherein the resource is rated with a rating by the user and tagged with a tag by the user,
   register the web server system by assigning an application ID and storing the application ID in an application registry wherein the application registry is stored in a central database coupled to the federation manager component,
   receive the tag, the rating, and a link to the resource at the federation manager component,
   store the tag, the rating, and the link in the central database coupled to the federation manager component,
   offer the resource for retrieval by another user web client,
   retrieve existing data from the registered web server system, wherein the retrieving is autonomous and not in response to the user initiating a transfer of the existing data, and wherein the existing data comprises links to resources, tags, and ratings not previously stored in the central database, store the existing data in the central database additionally recommend further resources which are related to a tag or resource requested by a user, offer a user interface for a user to tag the contents of a website, and display a tag cloud to the user wherein the tag cloud displays tags, resources, and a federative search, wherein the resources are located on any web server system registered in the central database, and wherein the federative search allows searching of the central database and all web server systems.

6. The federation manager component of claim 5, wherein the federation manager component is further configured to normalize different prevailing spelling types of a tag.

* * * * *